(12) United States Patent
Sankaranarayanan

(10) Patent No.: US 7,668,622 B2
(45) Date of Patent: Feb. 23, 2010

(54) EFFICIENT BLENDING BASED ON BLENDING COMPONENT AVAILABLITY FOR A PARTIAL BLEND DURATION

(75) Inventor: Sridhar Sankaranarayanan, Chennai (IN)

(73) Assignee: Honeywell International Inc., Morristown, NJ (US)

( * ) Notice: Subject to any disclaimer, the term of this patent is extended or adjusted under 35 U.S.C. 154(b) by 888 days.

(21) Appl. No.: 10/708,901

(22) Filed: Mar. 30, 2004

(65) Prior Publication Data

US 2005/0223633 A1 Oct. 13, 2005

(51) Int. Cl.
G05B 21/00 (2006.01)

(52) U.S. Cl. .................. 700/266; 700/239; 700/265; 700/285

(58) Field of Classification Search ............. 48/127.1; 137/2; 356/402; 585/1, 14; 700/239–241, 700/264–268, 272, 281–285; 703/2; 705/413
See application file for complete search history.

(56) References Cited

U.S. PATENT DOCUMENTS

| | | | | |
|---|---|---|---|---|
| 3,826,904 A * | 7/1974 | Leonard et al. | | 705/413 |
| 4,755,966 A | 7/1988 | Lee et al. | | |
| 5,093,533 A * | 3/1992 | Wilson | | 585/1 |
| 5,231,472 A * | 7/1993 | Marcus et al. | | 356/402 |
| 5,241,470 A | 8/1993 | Lee et al. | | |
| 5,758,047 A | 5/1998 | Lu et al. | | |
| 5,841,652 A | 11/1998 | Sanchez | | |
| 5,963,910 A | 10/1999 | Ulwick | | |
| 6,056,781 A | 5/2000 | Wassick et al. | | |
| 6,115,691 A | 9/2000 | Ulwick | | |
| 6,256,600 B1 | 7/2001 | Bolton et al. | | |
| 6,353,847 B1 | 3/2002 | Maruyama et al. | | |
| 6,487,459 B1 | 11/2002 | Martin et al. | | |
| 6,490,572 B2 | 12/2002 | Akkiraju et al. | | |
| 6,799,883 B1 * | 10/2004 | Urquhart et al. | | 366/152.4 |
| 6,866,830 B2 * | 3/2005 | Kwak | | 422/193 |
| 7,069,198 B2 * | 6/2006 | Snyder et al. | | 703/2 |
| 7,448,046 B2 * | 11/2008 | Navani et al. | | 719/316 |
| 2001/0013027 A1 | 8/2001 | Akkiraju et al. | | |
| 2001/0015222 A1 * | 8/2001 | Lewit et al. | | 137/2 |
| 2003/0078684 A1 | 4/2003 | Martin et al. | | |

FOREIGN PATENT DOCUMENTS

| | | |
|---|---|---|
| EP | 0207665 A1 | 1/1987 |
| EP | 0423906 B1 | 4/1991 |
| EP | 0842459 B1 | 8/1999 |
| EP | 0897560 B1 | 12/2002 |
| WO | WO 97/42553 A1 | 11/1997 |
| WO | WO 01/35614 A1 | 5/2001 |
| WO | WO 02/27564 A1 | 4/2002 |

* cited by examiner

*Primary Examiner*—Kidest Bahta
*Assistant Examiner*—Carlos Ortiz Rodriguez
(74) *Attorney, Agent, or Firm*—Schwegman, Lundberg & Woessner P.A.

(57) ABSTRACT

An aspect of the present invention takes advantage of the information of expected time of availability of an unavailable component to meet a desired criteria (e.g., minimize the aggregate cost of components). An intermediate product properties combination, which can be attained from an initial heel volume by mixing the available components, may be determined. The combination further permits the target product properties also to be attained from the intermediate product properties combination, while meeting various constraints and desired criteria. The flow controls of the individual components are accordingly controlled to blend the components and produce the desired product. Such features may be useful in environments such as oil refineries.

17 Claims, 13 Drawing Sheets

| Property | Values During Blend | | For End Product | |
|---|---|---|---|---|
| | Low | High | Low | High |
| Prop 1 | 80 | 95 | 88 | 89 |
| Prop 2 | 70 | 95 | 78 | 79 |
| Prop 3 | 10 | 60 | 30 | 60 |
| Prop 4 | 600 | 800 | 680 | 720 |
| Prop 5 | 1 | 4 | 1 | 4 |

FIG. 2

| Component | Prop 1 | Prop 2 | Prop 3 | Prop 4 | Prop 5 | Min Ratio | Max Ratio | Cost |
|---|---|---|---|---|---|---|---|---|
| C1 | 110 | 100 | 20 | 680 | 3 | 0 | 100 | 135 |
| C2 | 88 | 78 | 60 | 700 | 3 | 0 | 100 | 85 |
| C3 | 91 | 81 | 50 | 670 | 4 | 0 | 100 | 90 |
| C4 | 70 | 60 | 45 | 680 | 2 | 0 | 100 | 80 |
| C5 | 105 | 95 | 25 | 720 | 2 | 0 | 100 | 100 |
| Heel | 80 | 70 | 40 | 700 | 2 | NA | NA | NA |

*FIG. 3*

| Component Source | Min Flow | Max Flow | Min Vol | Max Vol |
|---|---|---|---|---|
| C1 | 0 | 450 | 0 | 15000 |
| C2 | 0 | 720 | 0 | 4000 |
| C3 | 0 | 600 | 0 | 5000 |
| C4 | 0 | 520 | 0 | 7000 |
| C5 | 0 | 450 | 0 | 5000 |

FIG. 4

| Property | Intermediate Product Property Range | |
|---|---|---|
| | Low | High |
| Prop 1 | 83.4125 | 83.9625 |
| Prop 2 | 73.413 | 73.9625 |
| Prop 3 | 19.964 | 66.375 |
| Prop 4 | 673.2 | 730.375 |
| Prop 5 | 0.1304 | 3.1046 |

FIG. 7

| 801 | 802 | 803 | 804 |
|---|---|---|---|
| Component | Volume consumed before The arrival of Comp5 | Volumes consumed after The Arrival of comp5 | Total |
| Comp 1 | 1102.50 | 0 | 1102.5 |
| Comp 2 | 3150 | 3850 | 7000 |
| Comp 3 | 3600 | 4400 | 8000 |
| Comp 4 | 1147.5 | 1210 | 2357.5 |
| Comp 5 | 0 | 1540 | 1540 |
| Total | 9000 | 11000 | 20000 |

*FIG. 8*

| Component | Volume consumed before The arrival of Comp5 | Volumes consumed after The Arrival of comp5 | Total |
|---|---|---|---|
| Comp 1 | 0 | 0 | 0 |
| Comp 2 | 3300 | 3700 | 7000 |
| Comp 3 | 3600 | 4400 | 8000 |
| Comp 4 | 2100 | 100 | 2200 |
| Comp 5 | 0 | 2800 | 2800 |
| Total | 9000 | 11000 | 20000 |

FIG. 9

| Property | Property maintained in the Header before the component gets added | Property maintained in the Header after the component gets added |
|---|---|---|
| Prop 1 | 85.00 | 93.36 |
| Prop 2 | 75.00 | 83.36 |
| Prop 3 | 52.50 | 46.95 |
| Prop 4 | 683.33 | 692.91 |
| Prop 5 | 3.166 | 3.136 |

FIG. 10

| Component | Volume consumed (Prior Approach) 1102 | Volume consumed (present invention) 1103 | Ratios Prior Approach Volume Consumed / Total Volume 1104 | Ratios in present invention Volume Consumed/ Total Volume 1105 | Cost In Prior Approach 1106 | Cost in present invention 1107 |
|---|---|---|---|---|---|---|
| Comp 1 | 1102.50 | 0 | 0.055 | 0 | 7.4418 | 0 |
| Comp 2 | 7000.00 | 7000 | 0.35 | 0.35 | 29.75 | 29.75 |
| Comp 3 | 8000.00 | 8000 | 0.4 | 0.4 | 36 | 36 |
| Comp 4 | 2357.50 | 2200 | 0.11 | 0.11 | 9.43 | 8.8 |
| Comp 5 | 1540.00 | 2800 | 0.077 | 0.14 | 7.7 | 14 |
| Total | 20000 | 20000 | 1 | 1 | 90.329 | 88.550 |

FIG. 11

EFFICIENT BLENDING BASED ON BLENDING COMPONENT AVAILABLITY FOR A PARTIAL BLEND DURATION

BACKGROUND OF INVENTION

1. Field of the Invention

The present invention relates to manufacturing technologies (such as oil refineries), and more specifically to a method and apparatus for blending when one or more of the components is available only for partial blend duration with components affecting several properties of the end product.

2. Related Art

Manufacturing plants are generally used to produce end products by blending several components ("blended components" or "blending components"). Blending generally refers to mixing components to produce an end product. It is used in several environments such as oil refineries, including without limitation, other process industries.

An end product is generally characterized by several properties. For example, petrol/gasoline has properties such as RON (Research Octane Number), MON (Motor Octane Number), RDON (Road Octane Number), RVP (Reid Vapor pressure), Benzene content, API gravity, recovery at various temperatures, and final boiling point The properties of blended components generally impact properties of the end product, and each component may impact a specific property to a different degree. Continuing with the example of above, Butane typically has a higher Octane number compared to the other blending components, for example, Butane has a Octane Number that is greater than 100, whereas the other Blending components may have a Octane number which is much less when compared to 100. Any increase of Butane in the blend will have a direct incremental impact on the Octane Number of the Blended product. However, Butane is also lower in Reid Vapor pressure compared to the other blending components, for example, RVP of Butane is in the range of 10 to 12 Kpa. When the Butane content in the Blend is increased then this would have a decremental impact on the Reid vapor pressure of the Blended product. Similarly, Light Reformats would have a high benzene content and will play a key role in increasing the Benzene content of the Blended product.

From the above, it may be appreciated that one skilled in the related art may conventionally determine the ratios of quantities of each component that may be used to generate an end product having desired (range) values of various properties. Accordingly, a manufacturing plant may blend the components in such ratios to produce an end product having desired properties.

Generally, executing such a conventional process has certain limitation such as, for example, timely availability of the blending components. Further, it is undesirable to wait until such components are available since production delays usually translate to economic loss. For convenience, it is assumed that only one component is unavailable and is referred to below as "unavailable component".

One another conventional process addresses such production delays by continuing the blending operation using available components at the time of blending. During execution of such a conventional process, ratio (flow-rate ratio or volumetric ratio, etc.) of blending is computed without taking into account expected time of availability of the unavailable component.

It may therefore be apparent that such conventional approaches do not address the issues pertaining to meeting at least some of desired objectives. For example, one objective could be to minimize the aggregate cost of components, but the conventional approach may use a relatively more expensive component in a substantial quantity (while desired properties could have been attained using less expensive components), thereby leading to an increase in the cost of aggregate components used.

Accordingly, there is a need in the related art to develop techniques, which enable desired objectives to be met while blending, when one or more of the components is available only for partial blend duration with components affecting several properties of the end product.

SUMMARY OF INVENTION

An aspect of the present invention enables efficient blending of components to produce a product having target (desired) properties, when each component impacts potentially multiple target properties when blended and when a first component is scheduled to be available only at a known time instance during blending. In an embodiment, a digital processing system receives data indicating the target properties, the manner in which each component impacts each target property, and an aggregate volume of the product to be produced. The digital processing system may determine an intermediate blend point at or after the time instance such that a corresponding intermediate properties combination can be attained at the intermediate blend point and the target properties can be attained from the intermediate blend point. The flow rate of each component is controlled to attain the intermediate properties combination before the intermediate blend point, and to attain the target properties from the intermediate properties combination after the intermediate blend point.

Several advantages may be attained by using such an approach. For example, the intermediate blend point may be computed to meet a desired criteria using various well-known approaches. In one embodiment, the criteria is to minimize the total cost of the components blended to produce the product. However, the desired criteria can be based on any considerations suitable for the specific situation according to various aspects of the present invention.

In an implementation, each component is provided for blending by corresponding outlets, and each source controller controls the flow rate of the corresponding outlet. In such an embodiment, a digital processing system may determine first flow rates of respective components before the intermediate blend point such that said intermediate properties combination is attained for the product at the intermediate time instance, and second flow rates of respective components after the intermediate blend point. The outlets are operated according to the first flow rates before the intermediate time point and according to the second flow rates after the intermediate time point to produce the product with the target properties.

The intermediate blend point may be determined using one of several known approaches. In an embodiment, a digital processing system determines the ideal volumes of components which would be blended if all components were to be available during entire blend duration, wherein the ideal volumes include a first ideal volume for the first (i.e., unavailable) component. The intermediate blend points are sought to be determined attempting to use the first ideal volume for the first component. If no such intermediate blend point is determined to be feasible, the volume for the first component is decremented, and feasible intermediate blend points are sought to be determined with the decremented volume for the first component.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF DRAWINGS

The present invention may be described with reference to the accompanying drawings briefly described below.

FIG. (Fig.) 1 is a block diagram depicting a typical environment to implement various aspects of the present invention.

FIG. 2 is a table illustrating desired range of values for the properties to be maintained in the blend header during the course of blending and for the end product at the end of the blend operation in an illustrative example scenario.

FIG. 3 is a table illustrating the manner in which each component affects each of the properties of the product in the illustrative example.

FIG. 4 is a table illustrating the flow constraints and volume constraints imposed by the equipment while blending the components in the illustrative example.

FIG. 7 is a table illustrating the range of intermediate property values computed in an embodiment for the illustrative example scenario.

FIG. 8 is a table illustrating the volumes of components consumed before and after arrival of a (unavailable) component in one prior approach.

FIG. 9 is a table illustrating the volumes of components consumed before and after arrival of a (unavailable) component in an embodiment of the invention.

FIG. 10 is a table containing blend properties in the blender before and after arrival of the (unavailable) component, illustrating some more example constraints, which are sought to be satisfied in the illustrative example.

FIG. 11 is shown containing a table illustrating the relative total costs and blended volumes for the components in the case of a prior approach and an aspect of the present invention for the illustrative example.

DETAILED DESCRIPTION

1. Overview

According to an aspect of the present invention, intermediate blend points with corresponding intermediate properties at or after the time instance at which an unavailable component is expected to be available, are computed. The intermediate blend points are computed such that the corresponding intermediate properties can be attained at the corresponding time instances, as well as the target properties can eventually be attained from the intermediate product properties (while satisfying various constraints) at the end of the blend operation. The intermediate blend points may be determined based on the manner in which each component affects each target (desired) property, a time instance at which the unavailable component is expected to be available, and an aggregate volume of the product to be produced. Various mathematical approaches can be used to determine the intermediate blend points.

Several aspects of the invention are described below with reference to examples for illustration. It should be understood that numerous specific example details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
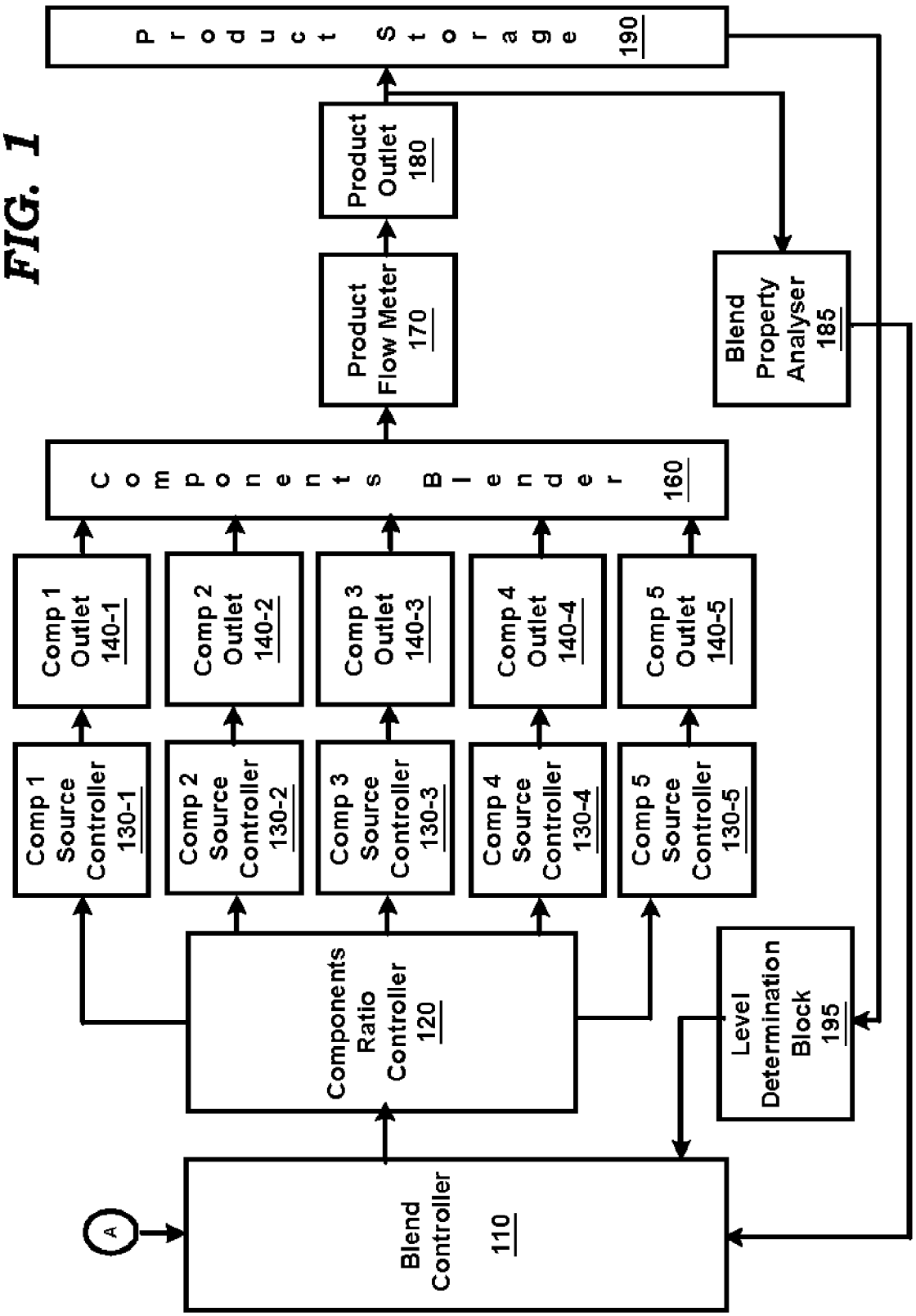

FIG. 1 is a block diagram illustrating the details of an example environment in which various aspects of the present invention can be implemented. The environment is assumed to represent an oil refinery merely for illustration. However, various aspects of the present invention can be used in other environments in which there is an overlap of properties (of a product sought to be produced) that are affected by the components in blending.

Merely for illustration, the block diagram is shown associated with an example in which five components are blended to produce a desired product. In addition, it should be understood that only representative example components are shown in the diagram so as not to obscure various features of the present invention. However, it will be apparent to one skilled in the relevant arts that environments may contain several other (both in number and type) components, without departing from the scope and spirit of various aspects of the present invention.

The block diagram is shown containing blend controller 110, components ratio controller 120, components source controller 130-1 through 130-5, component outlets 140-1 through 140-5, components blender 160, product flow meter 170, product outlet 180, blend property analyzer 185, product storage 190, and level determination block 195. Each block is described below in detail.

Components ratio controller 120 receives from blend controller 110 the ratios (e.g., in the form of volumes) in which the components are to be blended, and configures (programs) component source controllers 130-1 through 130-5 accordingly. Component source controllers 130-1 through 130-5 are configured to adjust and further control the flow rates of respective component outlets 140-1 through 140-5.

Component outlets 140-1 through 140-5 respectively permit corresponding exemplary five components to flow to component blender 160. Component blender 160 blends the received components, and channels the resulting product, to product storage 190 via product flow meter 170 and product outlet 180. Product flow meter 170 displays the volume of flow of the blended product by appropriate configuration of product outlet 180.

Blend property analyzer 185 typically analyzes the properties of product being transferred from components blender 160 to products storage 190 to determine the properties of the product produced by blending. The results are forwarded to blend controller 110. Level determination block 195 determines the present level of the product in product storage 190, and forwards the results to blend controller 110.

Components ratio controller 120, components source controller 130-1 through 130-5, components Outlets 140-1 through 140-5, components blender 160, product flow meter 170, blend property analyzer 185, product storage 190, and level determination block 195 may be implemented in a known way.

Blend controller 110 computes the ratios at which the components may desirably be blended at various time durations of the blending process. In one embodiment, the volumetric ratios for blending are computed first, and the volumetric ratios are then used to compute the corresponding flow ratios. The ratios may be computed while taking into account the time instances at which the corresponding components may become available and meeting any desired criteria (e.g., minimizing cost of components). The inputs used for such computation are logically represented by "A" in FIG. 1. The manner in which the ratios may be computed according to various aspects of the present invention is described below in further detail with reference to an example applicable to scenario.

3. Example Requirements

FIG. 2 includes a table illustrating the properties of a product sought to be produced. The table is shown containing three columns 201-203, with column 201 indicating the property that is subject of corresponding row 221-225, column 202 indicating a minimum and a maximum value for each property of the blend during blend and column 203 indicating a minimum and a maximum value for each property of product at the end of the blend. The properties of the columns may correspond to some of those noted in the background section in the context of oil refineries. Each row is described below in further detail.

In row 221, prop1 is shown to have a minimum value of 80 and maximum value of 95 during blend (i.e., within components blender 160, when being mixed). This row also indicates that the product sought to be produced needs to have a value for Prop 1 between 88 and 89, at the end of blend (as shown by point "D" of FIG. 6 described in sections below). Thus, the values in column 201 indicate the target properties for the product sought to be produced.

It should be understood that the values shown in column 202 of FIG. 2 represent example constraints while blending to produce the desired product. There can be other constraints as well. For example, each source controller 130-1 through 130-5 may be able to hold only a corresponding amount/volume of the component, each outlet 140-1 through 140-5 (described below with reference to FIG. 4) and 180 may have a corresponding maximum flow rate. All such constraints may need to be satisfied while producing a product of desired target qualities. The description is continued with respect to the manner in which each component may affect a specific quality of the product.

FIG. 3 contains a table illustrating the components that may be blended to produce a desired product, and the manner in which each component affects the specific properties of the product. The table is shown containing 9 columns with 301 indicating the specific component that is subject of corresponding row 321-325, columns 302 through 306 respectively indicating how the corresponding property is affected by the subject component, columns 307 and 308 indicating minimum and maximum ratio of the subject component that may be allowed in the blend, and column 309 indicates the cost per unit of the subject component.

Row 321 indicates properties of component C1 and how this component when blended affects each of the specific property of the product. The row indicates that adding one unit volume of component 1 affects properties 1-5 by 110, 100, 20, 680, and 3 respectively. Row 321 also indicates that the blend could contain between 0% and 100% of computed volume of this component, and the cost per unit of this component is 135. For example, when a blend contains only components C1 and C2 in equal proportion, value of prop1 is impacted linearly by volume of both C1 and C2 and this value is computed as 50/100*110+50/100*88. Rows 322 through 325 contains similar details for components C2-C5 respectively.

Row 326 contains property values of initial volume (heel) of the product in product storage, at the start of the blend. The row indicates that prop1 of heel (Point A of FIG. 6) is 80. It also indicates that heel has a value of 70 for prop2, 40 for prop3, 700 for prop4 and 2 for prop5. The description is continued with respect to additional constraints in producing such a product.

FIG. 4 contains a table illustrating some constraints posed by the equipments used in a manufacturing plant. The table is shown containing 5 columns with 401 indicating the specific component source posing some constraints that is subject of corresponding rows 421-425. Columns 402 and 403 respectively indicate minimum and maximum flow constraints imposed by outlets 140-1 through 140-4. Columns 404 and 405 indicate any minimum and maximum volumes of the subject component source. The maximum volume may be set by the storage capacity of source controllers and/or timely availability of the components.

Row 421 indicates that source controller 130-1 used to supply C1 (130-1 of FIG. 1) allows a minimum value of 0 units and a maximum value of 450 units to flow through its outlet (140-1 of FIG. 1). The row also indicates that this equipment could store between 0 and 15000 units of component C1. Rows 422 through 425 indicates similar constraints posed by other equipments used to supply components C2 to C5.

The description is continued with respect to the manner in which various aspects of the present invention enable a product to be produced within requirements such as those noted above. Merely for convenience, it is assumed that there is one unavailable component (C5) for blend and it becomes available at a specific time instance from start of blend.

4. Method

Figure 5:
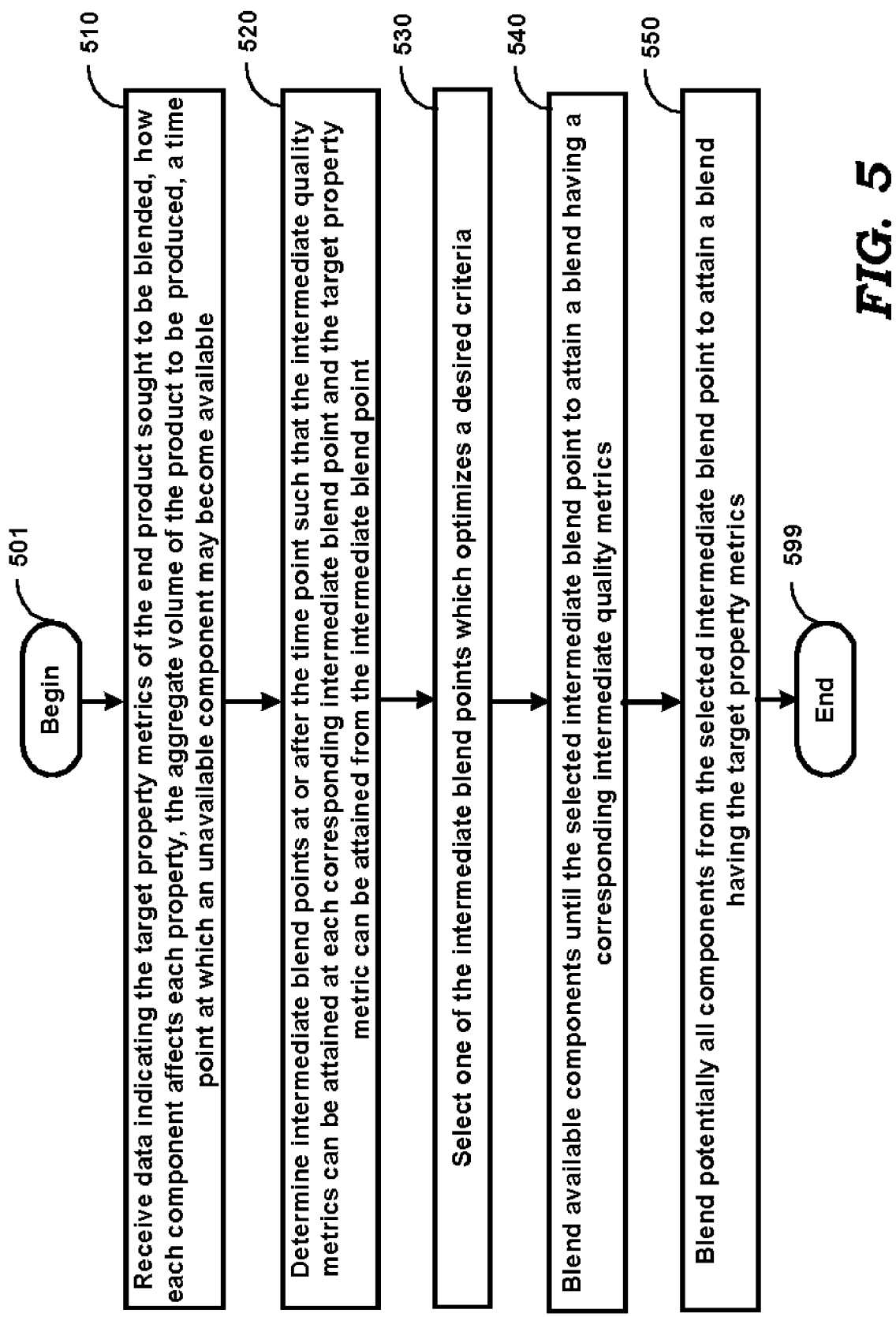
FIG. 5 is a flowchart illustrating the manner in which a product is blended according to an aspect of the present invention when one of the components is available only for a partial blend duration.

FIG. 5 is a flow chart illustrating the manner in which a product may be produced according to various aspects of the present invention. The method is described with reference to FIGS. 1-4 merely for illustration. However, the method can be implemented in other environments as well. The method begins in step 501 and control immediately passes to step 510.

In step 510, blend controller 110 receives data indicating the target properties of the end product sought to be produced, how each component affects each of the properties, the aggregate volume of the product to be produced, a time instance at which an unavailable component may become available. Some or all of the parameters may be received based on operator inputs and values generated by other digital processing systems.

In step 520, blend controller 110 determines intermediate blend points at or after the time instance such that the intermediate properties can be attained at each corresponding intermediate blend point and the target properties can be attained from the intermediate blend point while satisfying any other constraints. Such a determination can be performed using one of several approaches. An example approach is described in a section below in further detail.

In step 530, blend controller 110 selects one of the intermediate blend points, which meets a desired set of criteria. In one embodiment described below, the total cost of components is sought to be minimized. However, other criteria may also be used without departing from the scope and spirit of various aspects of the present invention.

In step 540, the available components are blended until the selected intermediate blend point to attain a blend having a corresponding intermediate quality metrics. In general, the ratios (or flow-rates) of components need to be determined to attain the intermediate quality metrics and the corresponding values are used to control source controllers 130-1 through 130-5 via components ratio controller 120.

In Step 550, potentially all components are blended from the selected intermediate blend point (i.e., when the unavailable component becomes available) to attain a blend having the target properties. Again, the ratios of components need to be determined to attain the target properties (from the intermediate properties), and the components mixed accordingly. The flow chart ends in step 599.

Due to the computations of step 520, the target properties may be attained while meeting a desired set of criteria. The features of the flow chart may be appreciated by comparison with an approach that does not use the information on expected time of availability of an unavailable component.

5. Comparison with a Conventional Approach

Figure 6:
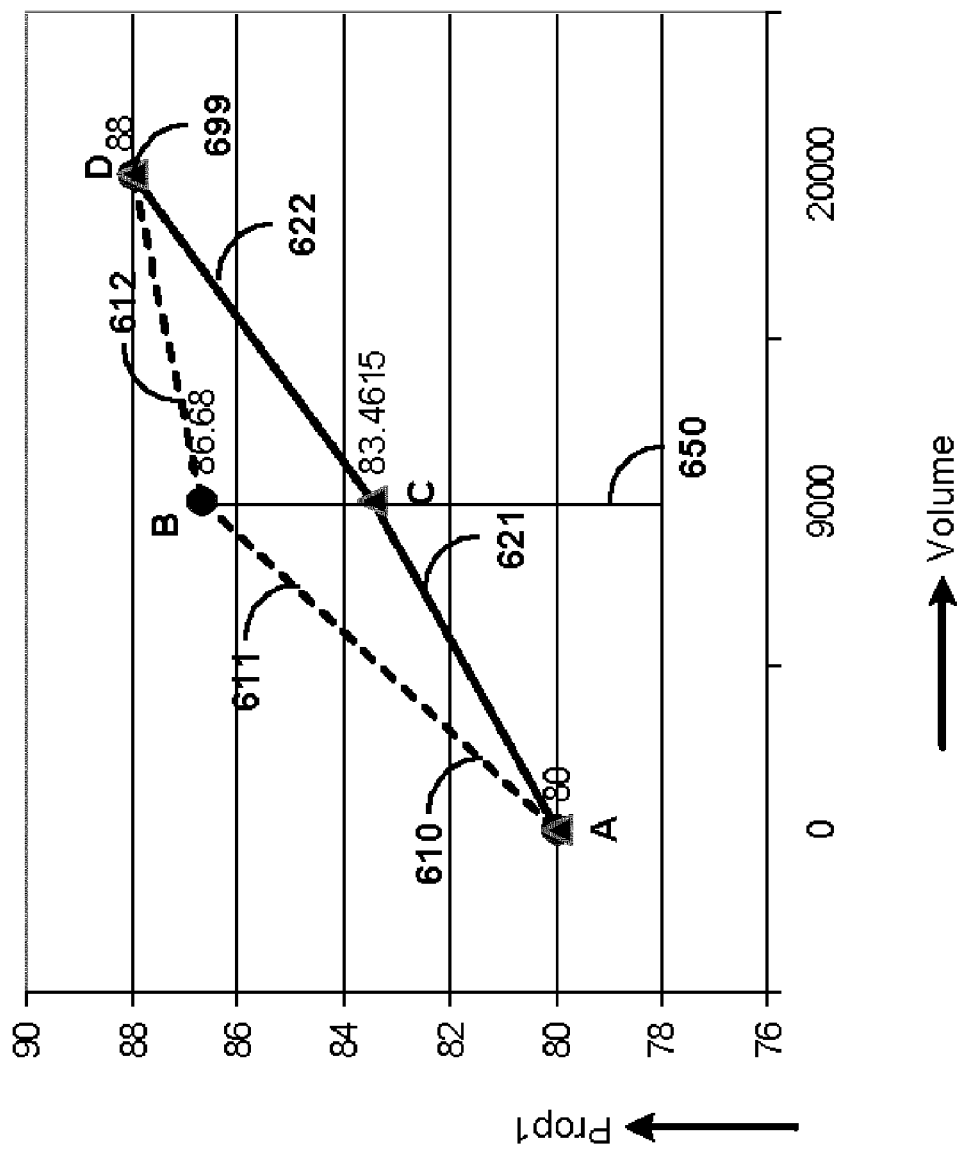
FIG. 6 is a graph containing two lines respectively depicting the value of property 1 (prop 1) at various volumes of blend during blending according to an aspect of the present invention and a prior approach.

FIG. 6 is a graph illustrating the advantages offered by various aspects of the present invention in comparison with a prior approach. The graph corresponds to one of the properties (Prop1) noted in the description above. Similarly, other properties also may be addressed in according to aspects of the present technique.

The graph is shown with blend quantity (i.e., the amount of product produced by blending) on X-axis and the present property value on Y-axis. The X-axis may also be viewed as representing lapse of time during blending and thus each point of X-axis is described as a time instance. For illustration, it is assumed that component C5 is expected to arrive at a time instance corresponding to 650. Time instance corresponding to 699 represents an expected end time instance for blending assuming that the aggregate flow rate (1500 in example noted above) is completely used during the entire blend duration. Two lines 610 and 621 are shown, which are described below in further detail.

Broken line 610 corresponds to a prior approach, which does not take advantage of such time of availability. As noted above in the background section, the prior approach may use blend ratios, which are computed without regard to the expected time of availability. The computed ratios are used up to time instance 650 and the corresponding present quality is represented by segment 611. The blend ratios are recomputed at time instance 650 and these newly computed ratios are used in segment 612.

Solid line 621 corresponds to an approach, which takes advantage of the information on the time of availability of component C5 in an embodiment of the present invention. Thus, the blend ratios in segment 621 are computed by determining an intermediate blend point (corresponding to time instance 650) having an associated intermediate blend properties which satisfy two conditions: (1) the intermediate blend properties are attainable in segment 621 (i.e., from start of blending to time instance 650) within the remaining constraints; and (2) the target product properties are attainable in segment 622 (between time instance 650 and the end of blend point 699). If multiple such properties are possible, an intermediate blend point, which meets a desired (set of) criteria (e.g., minimising cost) may be selected.

Due to the use of such approach described associated with solid line 621, the desired product may be produced meeting a desired criteria and also meeting other constraints as described below with reference to the tables of FIGS. 7 through 12.

6. Tables

FIG. 7 contains a table illustrating a range of intermediate blend properties at time instance 650 (of FIG. 6), which permit the target properties to be eventually achieved by time instance D (of FIG. 6) while minimizing the overall cost of components. The range may be determined using various mathematical models such as Linear Programming Model, as described in sections below. The specific intermediate blend property is determined taking into account the time duration after which the components are scheduled to become available or unavailable, starting quality of the product in the tank, constraints (property in the blend header, at the end of the blend, flow and volume), components qualities and the time duration that would be left after arrival of the component till the end of the blend. The intermediate values may be determined using techniques such as standard Mathematical models, which use Linear programming principles.

The table of FIG. 7 is shown containing three columns 701-703, with column 701 indicating the specific property that is subject of corresponding row 721-725, column 702 indicating a lower limit of intermediate blend property, and column 703 indicating an upper limit of the intermediate blend property.

Thus, row 721 indicates that the low and high values for property prop1 are respectively 83.4125 and 83.9625. As may be noted, solid line 621 of FIG. 6 has a value of 83.4615 at time instance 650, consistent with the requirement of row 721. The remaining rows are described similarly.

FIG. 8 contains a table illustrating computed volume of components used, based on the prior approach of broken line 610 of FIG. 6. The table is shown containing 4 columns 801-804, with 801 indicating the specific component name of corresponding row 821-825. Column 802 contains volume of components used, until time instance (i.e., 650 in the example of FIG. 6) when an unavailable component becomes available. Column 803 contains computed volume of each component used in blend during partial blend duration after (i.e., between 650 and point D of FIG. 6) unavailable component becomes available. Column 804 indicates total volume of each component used during entire blend duration in the prior approach.

Row 825 indicates that 0 units of comp 5 are consumed in the entry corresponding to column 802 since comp 5 is unavailable in the corresponding duration. The row further indicates that 1540 units of comp 5 are consumed thereafter in the remaining blend duration. Rows 821-824 is described similarly.

Row 826 indicates that a total of 9000 units are blended before the unavailable component (Comp 5) becomes available, and 11000 units are blended thereafter. The X-axis values in broken line 610 of FIG. 6 are consistent with these numbers. The description is continued to provide a comparison of the corresponding volumes of components used in an embodiment of the present invention.

FIG. 9 contains a table illustrating the computed volume of components used, in an embodiment of the present invention. The table is shown containing 4 columns 901-904 and six rows 921-926. The rows and columns are described below.

Column 901 indicates the specific component, which is the subject of corresponding row 921-925. Column 902 contains volume of components used in blend until time instance when an unavailable component becomes available. As may be readily appreciated, the volumes may be computed in step 540. Column 903 contains volume of components used in blend during partial blend duration after the unavailable component becomes available. The values of column 903 may be computed in step 550. Column 904 indicates total volume of each component used during entire blend duration.

Row 925 indicates that 0 units of Comp 5 are consumed in the entry corresponding to column 902 since the component is unavailable in the corresponding duration. The row further indicates that 2800 units of Comp 5 are used in the remaining blend duration.

As may be appreciated more units (2800 in FIG. 9 versus 1540 in FIG. 8) of Comp 5 are consumed in the embodiment according to the present invention compared to the prior embodiment described in FIG. 8. The use of more units leads to lesser total aggregate cost since Comp 5 is shown to be a cheaper (assumed to be the desired criteria) component than Comp 1 (which is used more in the described prior approach) in FIG. 3. Such an optimization is achieved as various aspects of the present invention take advantage of the information on expected time of availability of the unavailable component(s).

It may be appreciated that the various additional constraints may need to be satisfied while meeting the desired criteria. The blend properties noted above with respect to column 202 of FIG. 2 may also be satisfied, as described below with respect to FIG. 10.

FIG. 10 is a table containing the properties maintained in blender 160 before and after the unavailable component becomes available. The table illustrates that the properties (resulting due to mixing of components as per volumes depicted in FIG. 9) in the blender are within the ranges specified by column 202 of FIG. 2. The table of FIG. 10 is shown containing three columns 1001-1003 and rows 1021-1025.

Column 1001 indicates the specific property that is subject of corresponding row 1021-1025, column 1002 indicates value for properties until time instance when an unavailable component becomes available, and column 1003 indicates value of properties after this time.

Row 1021 indicates that prop1 has a value of 85.00 before the unavailable component (Comp 5) becomes available, and a value of 93.36 thereafter. The two values are consistent with the blend property constraint noted in row 221, column 202 of FIG. 2, as desired. The remaining rows 1022-1024 are described similarly. The description is continued with reference to a summary of comparison of various results due to the use of the prior approach of broken line 610 and the illustrative embodiment of the present invention.

FIG. 11 is a table containing differences in values of various parameters such as cost, ratio and volume of each component consumed, between the prior approach and present invention thereby illustrating the advantages attained in the illustrative example above. The table is shown containing 7 columns 1101-1107, with 1101 indicating the specific component that is subject of corresponding row 1121-1125. Columns 1102 and 1103 respectively contain the same values as 804 and 904, and the description is not repeated in the interest of conciseness.

Columns 1104 and 1105 respectively are shown containing values for ratios of components used in corresponding approaches. Each ratio is generally computed by dividing the corresponding volume by the aggregate blend volume in the corresponding duration. Columns 1106 and 1107 contain the aggregate cost due to the corresponding component.

Row 1125 (unavailable component) indicates that a total of 1540 units of Comp 5 are used in the example prior approach leading to a corresponding cost of 7.7 (computed according to the table of FIG. 3). On the other hand, in the illustrative embodiment in accordance with the present invention, a total of 2800 units of Comp 5 are used leading to a cost of 14. The remaining rows 1121-1124 are similarly described.

Row 1126 is shown containing the total cost for producing same volume of a product using the prior approach and present invention. The cost of production using the prior approach is 90.329 and that based on present invention is 88.550. The lower cost is attained since various aspects of the present invention take advantage of available information on any expected time of availability of unavailable components.

It may be appreciated that the above tables are described assuming that the optimal intermediate product properties are determined. Various mathematical/heuristics based approaches can be used to determine such properties. An example approach to determine the optimal intermediate product properties is described below in further detail.

7. Determining Intermediate Product Properties

Figure 12:
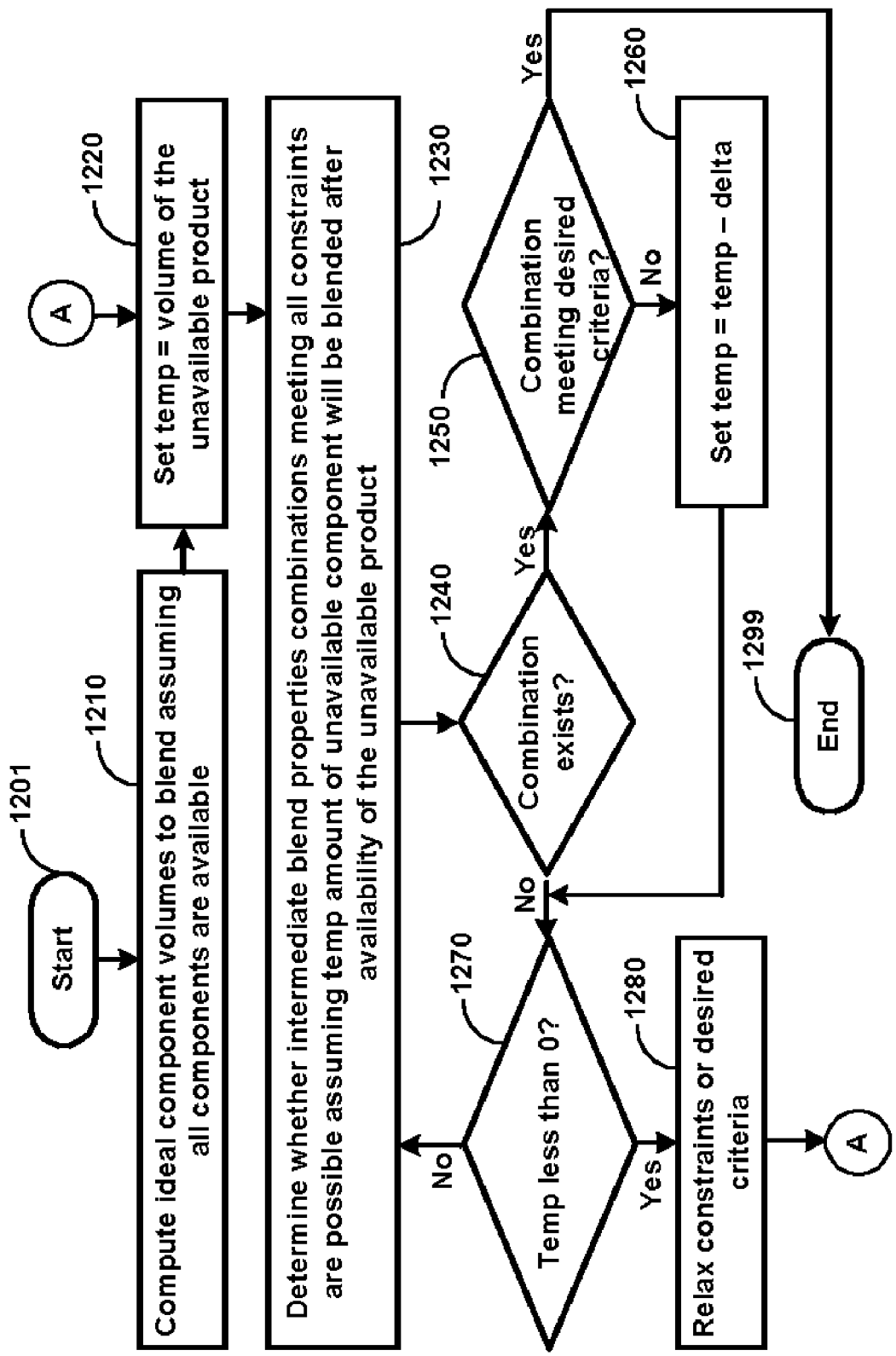
FIG. 12 is a flow chart illustrating the manner in which the intermediate properties combination may be determined in an embodiment of the present invention.

FIG. 12 is a flow chart illustrating the manner in which the intermediate product properties (corresponding to point 650) may be determined according to an aspect of the present invention. The flowchart begins in step 1201, in which control immediately passes to step 1210.

In step 1210, blend controller 110 determines ideal component volumes to blend assuming all components (including C5 of the illustrative example) are available. In other words, the component volumes are determined considering the desired criteria and various constraints, but assuming that all the components are available.

It may be appreciated that such a computation indicates the optimal volume/amount (quantity in general) of the unavailable component (C5) that should be ideally used to achieve the desired criteria. Accordingly, in step 1220, blend controller 110 sets a variable temp to equal the volume of the unavailable product.

In step 1230, blend controller 110 determines whether at least one intermediate blend properties combination meeting all constraints is possible assuming temp amount of unavailable component will be blended after availability of the unavailable component. In other words, each such intermediate blend properties combination is attainable from the initial heel volume, and the target product properties is attainable from the intermediate blend properties, while meeting various constraints.

In step 1240, blend controller 110 determines whether at least one such combination exists. Control passes to step 1250 if such a combination exists, otherwise to step 1270.

In step 1250, blend controller 110 determines whether at least one combination meets the desired criteria. In one embodiment, the desired criteria is set to merely minimize the cost. In such a case, the combination providing the least cost (computed according to table 3) is deemed to meet the desired criteria. Alternatively, the desired criteria may contain a threshold for a total cost, and a combination may be deemed to meet the desired criteria only if the corresponding total cost is less than or equal to such a threshold.

Control passes to step 1260 if the desired criteria is not met or if additional search is desirable for whatever reasons. Otherwise, since the desired intermediate properties combination is found, control passes to step 1299, in which the method ends.

In step 1260, blend controller 110 may decrease variable temp by delta, and control passes to step 1270. Delta may be chosen to be any positive integer, and can vary to permit various search approaches, as is well known in the relevant arts. In step 1270, control passes to step 1230 if temp is greater than 0, or else to step 1280. The search for intermediate blend properties continues in step 1230 with the new value of temp.

In step 1280, blend controller 110 may relax constraints or desired criteria. For example, the threshold for the total cost (noted above in step 1250) may be increased. Control then passes to step 1220 to continue the search. It should be understood that the approaches of above may be used by blend controller 110 to determine various intermediate product properties combinations first, and select one of the combinations without terminating the search in step 1260 noted above.

It should be understood that the approach(es) of above can be extended to situations in which an unavailable component (C5 above) becomes available earlier or later than an expected time of arrival (650 of FIG. 6). In such a situations, the computations of above may be performed again treating the presently available volume in the storage 190 as heel. The above approach can also be extended to situations when multiple components may not be available at the start of the blend and information regarding expected time of availability of these components is known. In such a situation, the concept could be extended to determine various combinations of intermediate blend points and intermediate blend properties until the best combination that meets example requirements is determined.

Once the desired optimal combination is determined, the product blending may be continued accordingly as described above with reference to FIG. 6. As a result, various aspects of the present invention permit that any desired criteria can be potentially met if one of the components is available only for partial blend duration with components affecting several properties of the end product.

It should be understood that blend controller 110 can be implemented substantially in the form of a digital controller system controlled by software instructions as described below in further detail.

8. Software-Driven Implementation

Figure 13:
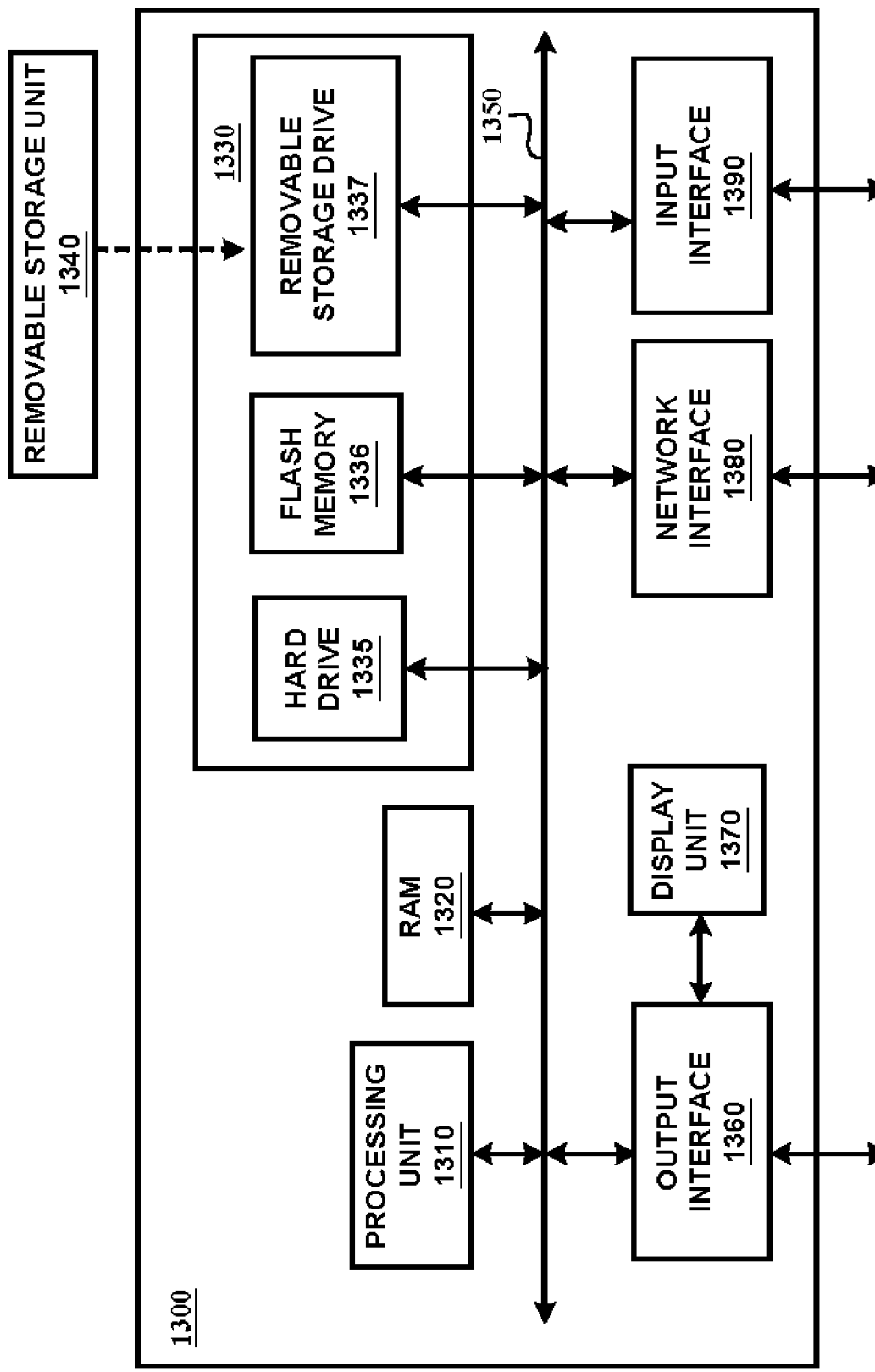
FIG. 13 is a block diagram illustrating the manner in which various aspects of the present invention can be implemented substantially in the form of software instructions.

FIG. 13 is a block diagram illustrating the details of digital processing system 1300 implemented substantially in the form of software in an embodiment of the present invention. System 1300 may correspond to a portion of blend controller 110. System 1300 may contain one or more processors such as central processing unit (CPU) 1310, random access memory (RAM) 1320, secondary memory 1330, graphics controller 1360, display unit 1370, network interface 1380, and input interface 1390. All the components except display unit 1370 may communicate with each other over communication path 1350, which may contain several buses as is well known in the relevant arts. The components of FIG. 13 are described below in further detail.

CPU 1310 may execute instructions stored in RAM 1320 to provide several features of the present invention. CPU 1310 may contain multiple processing units, with each processing unit potentially being designed for a specific task. Alternatively, CPU 1310 may contain only a single general purpose processing unit. RAM 1320 may receive instructions from secondary memory 1330 using communication path 1350. The instructions may determine the intermediate property points and the flow rates before and after the selected intermediate property point, and configure components ratio controller 120 accordingly.

Graphics controller 1360 generates display signals (e.g., in RGB format) to display unit 1370 based on data/instructions received from CPU 1310. Display unit 1370 contains a display screen to display the images defined by the display signals. Input interface 1390 may correspond to a key-board and/or mouse. Graphics controller 1360 and input interface 1390 may enable an user to indicate information related to components availability, initial heel volume, etc.

Secondary memory 1330 may contain hard drive 1335, flash memory 1336 and removable storage drive 1337. Secondary memory 1330 may store the data and software instructions (e.g., methods instantiated by each of client system), which enable system 1300 to provide several features in accordance with the present invention. Some or all of the data and instructions may be provided on removable storage unit 1340, and the data and instructions may be read and provided by removable storage drive 1337 to CPU 1310. Floppy drive, magnetic tape drive, CD-ROM drive, DVD Drive, Flash memory, removable memory chip (PCMCIA Card, EPROM) are examples of such removable storage drive 1337.

Removable storage unit 1340 may be implemented using medium and storage format compatible with removable storage drive 1337 such that removable storage drive 1337 can read the data and instructions. Thus, removable storage unit 1340 includes a computer readable storage medium having stored therein computer software and/or data.

In this document, the term "computer program product" is used to generally refer to removable storage unit 1340 or hard disk installed in hard drive 1335. These computer program products are means for providing software to system 1300. CPU 1310 may retrieve the software instructions, and execute the instructions to provide various features of the present invention as described above.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

The invention claimed is:

1. A method of blending a plurality of components to produce a product having a plurality of target properties, each of said plurality of components impacting one or more of said plurality of target properties and at least some of said plurality of target properties being impacted by multiple components when blended, said method comprising:

receiving in a digital processing system data indicating said plurality of target properties, the manner in which each of said plurality of components impacts any of said plurality of target properties, an aggregate volume of said product to be produced and whether a first component is available from start of said blending, said received data also indicating a time instance at which said first component is available, said time instance being after a substantial continuous duration from said start of said blending;

if all of said plurality of components, including said first component, are available at said start of said blending, computing component volumes of said plurality of components that would produce said product with said plurality of target properties and performing said blending to produce said product whereby said first component is also used from said start of said blending;

if said first component is not available at said start of said blending:

determining in said digital processing system an intermediate blend point at or after said time instance such that a corresponding intermediate properties combination can be attained at said intermediate blend point by blending only the available ones of said plurality of components from said start of said blending and said plurality of target properties can be attained by further blending said plurality of components including said first component from said intermediate blend point which would produce said aggregate volume of said product; and controlling flow rates of each of said plurality of components to attain said intermediate properties combination at said intermediate blend point, and to attain said plurality of target properties from said intermediate properties combination after said intermediate blend point, whereby said product of said aggregate volume is generated by blending said plurality of components, wherein said determining comprises:

computing using said digital processing system a plurality of ideal volumes corresponding to said plurality of components which would be blended if said first component were to be available during entire blend duration, wherein said plurality of ideal volumes includes a first ideal volume for said first component;

assigning said first ideal volume to a temporary variable;

searching whether one or more of said intermediate blend points are feasible with said temporary variable as a volume for said first component;

if one or more of said intermediate blend points are feasible, performing said controlling using one of said one or more intermediate blend points to control the flow rates of said plurality of components; and if any of said intermediate blend points is not feasible, decreasing said temporary variable by an amount and performing said searching.

2. The method of claim 1, wherein said determining determines said intermediate blend point to meet a desired criteria.

3. The method of claim 2, wherein said desired criteria comprises minimizing total cost of said plurality of components blended to produce said product.

4. The method of claim 1, wherein each of said plurality of components are provided for said blending by a corresponding plurality of outlets, wherein each of a plurality of source controllers control the flow rate of a corresponding one of said plurality of outlets, said method further comprises:

determining in said digital processing system each of a first plurality flow rates for a corresponding one of each of said plurality of components before said intermediate blend point such that said intermediate properties combination is attained for said product at said intermediate blend point;

determining in said digital processing system each of a second plurality flow rates for a corresponding one of each of said plurality of components after said intermediate blend point such that said plurality of target properties are attained for said product after said intermediate blend point, wherein said controlling is performed by operating said plurality of outlets according to said first plurality of flow rates before said intermediate blend point and said second plurality of flow rates after said intermediate blend point.

5. The method of claim 1, wherein said searching finds said one or more intermediate blend points consistent with a plurality of constraints posed by a manufacturing plant.

6. The method of claim 1, wherein said method is performed in an oil refinery.

7. The method of claim 1, wherein said first component is not available at said start of said blending and is designed to enhance a first set of properties comprised in said plurality of target properties when blended, wherein said available ones of said plurality of components include a second set of components which when blended enhance said first set of properties, at least some of said second set of components being blended by a higher volume up to said intermediate blend point compared to if said first component were to be available from said start of said blending.

8. A computer readable medium storing one or more sequences of instructions for causing a computer system to support a blending of a plurality of components to produce a product having a plurality of target properties, each of said plurality of components affecting one or more of said plurality of target properties and at least some of said plurality of target properties being impacted by multiple components when blended, a first component being scheduled to be available for said blending only at a time instance which is after a substantial continuous duration from start of said blending, wherein said first component is comprised in said plurality of components and is designed to enhance a first set of properties comprised in said plurality of target properties when blended, wherein execution of said one or more sequences of instructions by one or more processors contained in said computer system causes said one or more processors to perform the actions of:

receiving data indicating said plurality of target properties, the manner in which each of said plurality of components affects any of said plurality of target properties, said time instance, and an aggregate volume of said product to be produced; and determining an intermediate blend point at or after said time instance such that a corresponding intermediate properties combination can be attained at said intermediate blend point by blending only the available ones of said plurality of components and said plurality of target properties can be attained by further blending said plurality of components including said first component from said intermediate blend point which would produce said aggregate volume of said product, wherein flow rates of each of said plurality of components are controlled to attain said intermediate properties combination at said intermediate blend point, and to attain said plurality of target properties from said intermediate properties combination after said intermediate blend point, wherein said product of said aggregate volume is generated by blending said plurality of components, wherein said available ones of said plurality of components include a second set of components which when blended enhance said first set of properties, at least some of said second set of components being blended by a higher volume up to said intermediate blend point compared to if said first component were to be available from said start of said blending, wherein said determining comprises:

computing a plurality of ideal volumes corresponding to said plurality of components which would be blended if said first component were to be available during entire blend duration, wherein said plurality of ideal volumes includes a first ideal volume for said first component;

setting a temporary variable equal to said first ideal volume;

finding whether one or more of said intermediate blend points are possible with said temporary variable as volume for said first component;

if one or more of said intermediate blend points are possible, using one of said one or more intermediate blend points to control the flow rates of said plurality of components; and if one or more of said intermediate blend points are not possible, decreasing said temporary variable by an amount and performing said finding.

9. The computer readable medium of claim 8, wherein said determining determines said intermediate blend point to meet a desired content.

10. The computer readable medium of claim 9, wherein said desired criteria comprises minimizing total cost of said plurality of components blended to produce said product.

11. The computer readable medium of claim 8, wherein each of said plurality of components are provided for blending by a corresponding plurality of outlets, wherein each of a plurality of source controllers control the flow rate of a corresponding one of said plurality of outlets, further comprises:

determining in said computer system each of a first plurality flow rates for a corresponding one of each of said plurality of components before said intermediate blend point such that said intermediate properties combination is attained for said product at said intermediate blend point;

determining in said computer system each of a second plurality flow rates for a corresponding one of each of said plurality of components after said intermediate blend point such that said plurality of target properties are attained for said product after said intermediate blend point;

wherein said controlling is performed by operating said plurality of outlets according to said first plurality of flow rates before said intermediate blend point and said second plurality of flow rates after said intermediate blend point.

12. The computer readable medium of claim 8, wherein said finding finds said one or more intermediate blend points consistent with a plurality of constraints posed by a manufacturing plant.

13. The computer readable medium of claim 8, further comprising:

if all of said plurality of components, including first component, are available, computing component volumes of said plurality of components that would produce said product with said plurality of target properties and performing said blending to produce said product based on said component volumes, whereby said first component is also used from said start of said blending.

14. A manufacturing plant for blending a plurality of components to produce a product having a plurality of target properties, each of said plurality of components affecting one or more of said plurality of target properties and at least some of said plurality of target properties being impacted by multiple components when blended, a first component being scheduled to be available for said blending in said manufacturing plant only at a time instance which is after a substantial continuous duration from start of said blending, wherein said first component is comprised in said plurality of components and is designed to enhance a first set of properties comprised in said plurality of target properties when blended, said manufacturing plant comprising:

a blender;

a plurality of outlets, wherein each of said plurality of outlets provides a corresponding one of said plurality of components according to a corresponding flow rate for blending by said blender;

a plurality of source controllers, wherein each of said plurality of source controllers controls the flow rate of a corresponding one of said plurality of outlets; and a blend controller determining the flow rate for each of said plurality of source controllers, said blend controller is configured to:

receive data indicating said plurality of target properties, the manner in which each of said plurality of components affects any of said plurality of target properties, said time instance, and an aggregate volume of said product to be produced;

determine an intermediate blend point at or after said time instance such that a corresponding intermediate properties combination can be attained at said intermediate blend point by blending only the available ones of said plurality of components and said plurality of target properties can be attained by further blending said plurality of components including said first component from said intermediate blend point which would produce said aggregate volume of said product; and control flow rates of each of said plurality of components to attain said intermediate properties combination at said intermediate blend point, and to attain said plurality of target properties from said intermediate properties combination after said intermediate blend point, wherein said product of said aggregate volume is generated by blending said plurality of components, wherein said available ones of said plurality of components include a second set of components which when blended enhance said first set of properties, at least some of said second set of components being blended by a higher volume up to said intermediate blend point compared to if said first component were to be available from said start of said blending, wherein to perform said determine, said blend controller is further configured to:

compute a plurality of ideal volumes corresponding to said plurality of components which would be blended if said first component were to be available during entire blend duration, wherein said plurality of ideal volumes includes a first ideal volume for said first component;

assign said first ideal volume to a temporary variable;

search whether one or more of said intermediate blend points are feasible with said temporary variable as volume for said first component;

if one or more of said intermediate blend points are feasible, said control using one of said one or more intermediate blend points to control the flow rates of said plurality of components; and if any of said intermediate blend points is not feasible, decreasing said temporary variable by an amount and performing said search.

15. The manufacturing plant of claim 14, wherein said intermediate blend point is determined to meet a desired criteria.

16. The manufacturing plant of claim 15, wherein said desired criteria comprises minimizing total cost of said plurality of components blended to produce said product.

17. The manufacturing plant of claim 14, wherein each of said plurality of components is provided for blending by a corresponding outlet of said plurality of outlets, wherein each of said plurality of source controllers controls the flow rate of the corresponding outlet of said plurality of outlets, said blend controller is further configured to:

determine each of a first plurality flow rates for a corresponding one of each of said plurality of components before said intermediate blend point such that said intermediate properties combination is attained for said product at said intermediate blend point;

determine each of a second plurality flow rates for a corresponding one of each of said plurality of components after said intermediate blend point such that said plurality of target properties are attained for said product after said intermediate blend point, wherein said control is performed by operating said plurality of outlets according to said first plurality of flow rates before said intermediate blend point and said second plurality of flow rates after said intermediate blend point.

* * * * *